(12) United States Patent
Ohta

(10) Patent No.: US 8,102,447 B2
(45) Date of Patent: Jan. 24, 2012

(54) PHOTOGRAPHING DEVICE

(75) Inventor: Naoya Ohta, Maebashi (JP)

(73) Assignee: National University Corporation Gunma University, Maebashi-shi, Gunma (JP)

( * ) Notice: Subject to any disclaimer, the term of this patent is extended or adjusted under 35 U.S.C. 154(b) by 261 days.

(21) Appl. No.: 11/813,664

(22) PCT Filed: Jan. 11, 2006

(86) PCT No.: PCT/JP2006/300163
§ 371 (c)(1),
(2), (4) Date: Jul. 10, 2007

(87) PCT Pub. No.: WO2006/075581
PCT Pub. Date: Jul. 20, 2006

(65) Prior Publication Data
US 2009/0066801 A1    Mar. 12, 2009

(30) Foreign Application Priority Data
Jan. 14, 2005    (JP) ................................. 2005-008134

(51) Int. Cl.
H04N 9/097    (2006.01)
H04N 3/14    (2006.01)
H04N 9/64    (2006.01)
(52) U.S. Cl. ........................... 348/259; 348/272; 348/33
(58) Field of Classification Search .................. 348/259, 348/265, 266, 270, 271, 272, 277–279, 290
See application file for complete search history.

(56) References Cited

U.S. PATENT DOCUMENTS

| 4,664,470 | A | * | 5/1987 | Yerazunis | 359/359 |
|---|---|---|---|---|---|
| 4,763,966 | A | * | 8/1988 | Suzuki et al. | 252/587 |
| 5,319,472 | A | * | 6/1994 | Hill et al. | 358/500 |
| 5,398,058 | A | * | 3/1995 | Hattori | 348/224.1 |
| 6,038,023 | A | * | 3/2000 | Carlson et al. | 356/326 |
| 6,137,532 | A | * | 10/2000 | Kim | 348/222.1 |
| 6,211,906 | B1 | * | 4/2001 | Sun | 348/144 |
| 2002/0071605 | A1 | | 6/2002 | Iida et al. | 382/165 |
| 2003/0026517 | A1 | * | 2/2003 | Shimoda | 385/14 |
| 2004/0178463 | A1 | * | 9/2004 | Merrill et al. | 257/440 |
| 2004/0263638 | A1 | | 12/2004 | Ohsawa et al. | 348/222.1 |
| 2005/0099513 | A1 | * | 5/2005 | Ishibashi | 348/234 |
| 2005/0253928 | A1 | * | 11/2005 | McKeown et al. | 348/164 |

FOREIGN PATENT DOCUMENTS

| JP | 05322653 A | 12/1993 |
|---|---|---|
| JP | 2001-078226 | 3/2001 |
| JP | 2001352559 A | 12/2001 |
| JP | 2002-185974 | 6/2002 |
| JP | 2003-141518 | 5/2003 |

OTHER PUBLICATIONS

Japanese office action dated May 25, 2010 and its English language translation for corresponding Japanese application 2006552913 lists the references above.

* cited by examiner

*Primary Examiner* — Lin Ye
*Assistant Examiner* — Euel Cowan
(74) *Attorney, Agent, or Firm* — Hogan Lovells US LLP

(57) ABSTRACT

An image with a bright image plane can be photographed without deteriorating the yield. An object is photographed by a CCD (18) through each of plural filters ($14_1$-$14_N$) that have optical films vacuum deposited thereon so that spectral transmission characteristics vary between the filters periodically. Image data obtained by photographing is converted into image data which corresponds to a band by using a plurality of coefficients for converting the spectral transmission characteristics of the filter into spectral transmission characteristics of the target band.

11 Claims, 8 Drawing Sheets

TRANSMISSION CHARACTERISTICS OF EACH FILTER

CONFIGURATION OF BAND PASS FILTER

TRANSMISSION CHARACTERISTICS OF EACH FILTER LAYER

RESULT OF COMBINING TRANSMISSION CHARACTERISTICS OF EACH LAYER

STRUCTURE OF OPTICAL FILTER USED IN THE PRESENT PATENT

F I G. 6 A
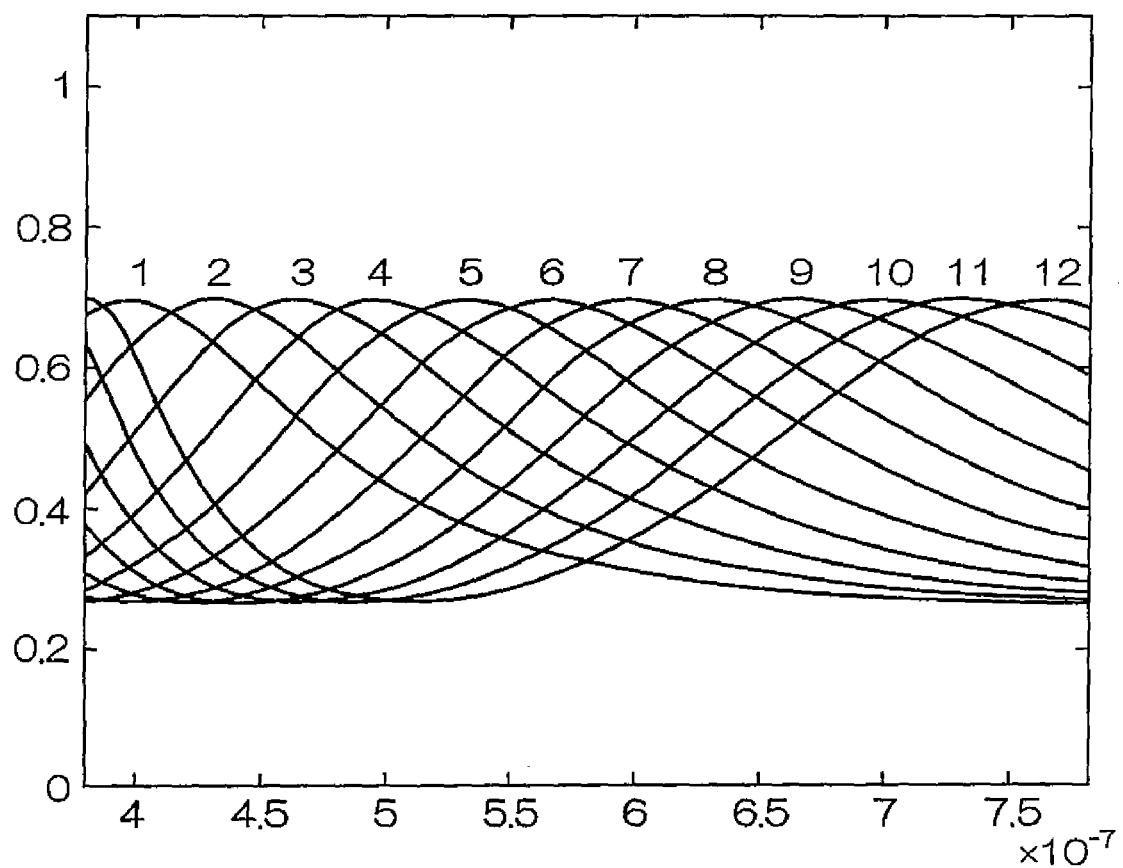

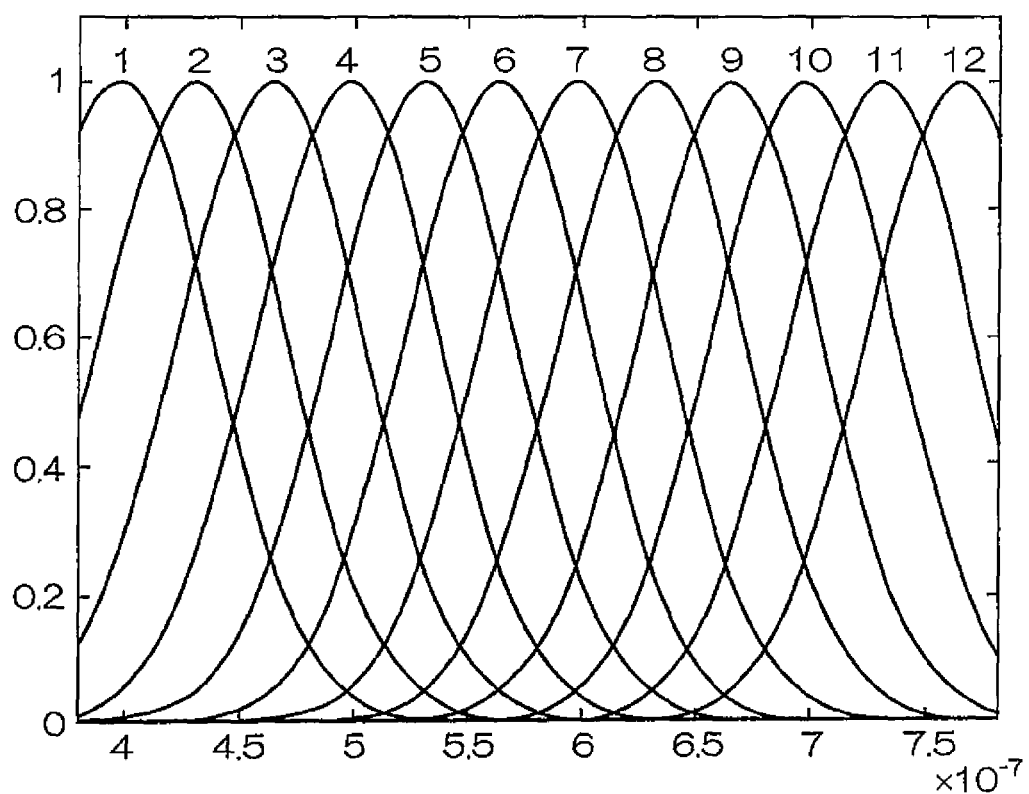
F I G. 6 B

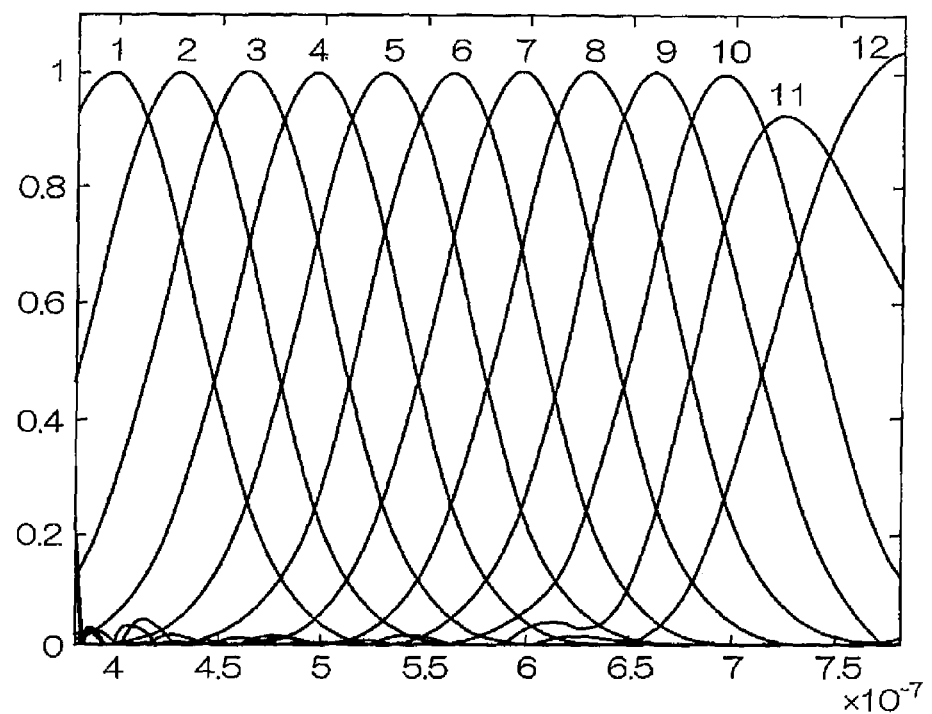
F I G. 6C

PHOTOGRAPHING DEVICE

CROSS-REFERENCE TO THE RELATED APPLICATIONS

This application is a national phase of the international application No. PCT/JP2006/300163 filed Jan. 11, 2006, which is also claims benefit of priority under 35 U.S.C. §119 to Japanese Patent Application No. 2005-008134 filed Jan. 14, 2005, the entire contents of which are incorporated by reference.

TECHNICAL FIELD

The present invention relates to a photographing device, and in particular to a multispectral camera that uses plural filters with different spectral transmission characteristics from each other for photographing an object.

RELATED ART

Multispectral cameras are conventionally known, as cameras that analyze with high precision the light spectrum into plural bands and form an image (see Japanese Patent Application (JP-A) No. 2002-185974). Such multispectral cameras are able to obtain images analyzed from more than three bands, in contrast to the visible light of three bands (wavelength regions) of red (R), green (G), and blue (B) that is analyzed and formed into images with normal cameras. In such multispectral cameras, if an image of n channels is to be obtained, for example, then n individual band pass filters transmitting each of the bands are used. The transmission characteristics of each of the band filters are like the example shown in FIG. 1.

Generally interference filters are used for the optical band pass filters used in multispectral cameras. Interference filters in principle have a structure of multiple conductive thin films layered onto a substrate such as glass, as shown in FIG. 2. The basic principle by which such a structure obtains band pass characteristics is the following. If the thickness of the conductive layer is d, and the refractive index thereof is n, then the wavelength λ of the light that gives a maximum for the transmission characteristics is represented by the following equation wherein m is an integer.

$$2nd = m\lambda$$

Therefore, maxima of the wavelengths of the transmitted light through a single layer thin film appear periodically. The wavelength and the periodicity of the maxima vary with the refractive index n and the thickness d. Here, by setting, for example, 3 layers of appropriate thicknesses $d_1$, $d_2$ and $d_3$, and appropriate refractive indices, as shown in FIG. 2, when at a particular wavelength the maxima of the transmission characteristics match, as shown in FIG. 3, then, since the overall transmission characteristics are the sum of the transmission characteristics of each of the layers, band pass characteristics are obtained such as those shown in FIG. 4.

DISCLOSURE OF THE INVENTION

Problem to be Solved by the Invention

However, in order to raise the spectral resolution power of multispectral cameras, images of many bands must be obtained using many individual filters with narrow band widths, and as the band width of the filters gets narrower the amount of light transmitted is reduced, and the problem arises that the image inevitably becomes dark. Furthermore, when many individual filters with narrow band widths are used, because the amount of light transmitted is reduced, as above, this leads to an increase in the exposure time, and the problem arises that it is difficult to photograph and measure an object in a short period of time. Furthermore, in order to produce filters with a narrow band width it is necessary to generate a considerable number of layers of exact film thicknesses, and there is the problem that the yield during production becomes poor.

The present invention is made to resolve the above problems and an object of the invention is to provide a photographing device that may photograph an image with a bright image plane, without worsening the yield thereof.

Method of Solving the Problem

In order to achieve the above object the present invention is configured to include: plural filters that have different spectral transmission characteristics from each other; a photographing means that is provided with plural photoelectric converting elements and that receives light from a photographic object through the respective filters with the photoelectric converting elements and that outputs image data according to the amount of the light received; a storage means that stores, for each band of a plurality of bands, plural coefficients for converting the filter spectral transmission characteristics into spectral transmission characteristics of the target band(s); a converting means for, using the image data output from the photographing means and using the plurality of coefficients that corresponds with at least one of the bands that have been stored in the storage means, converting the image data that has been output from the photographing means into image data that corresponds with the at least one of the bands.

The principle of the present invention is that by computing image data that has been photographed through plural filters having plural different spectral transmission characteristics, image data for the target spectral transmission characteristics is obtained.

The plural filters of the present invention may be configured by vacuum depositing respective single layer, or a few, optical films of different thicknesses. By using filters of vacuum deposited single layer, or a few, films, the problem of a reduction of yield during production may be resolved.

EFFECT OF THE INVENTION

As explained above, according to the present invention, since filters of vacuum deposited single layer, or a few, optical films are used the yield during production may be improved, and furthermore since the amount of light transmitted through each of the filters is large, a photographing device that is able to photograph a bright image may be provided.

BRIEF DESCRIPTION OF THE DRAWINGS

FIG. 6A is a graph showing the transmission characteristics of each of the filters of FIG. 5.

FIG. 6B is a graph showing the transmission characteristics for each band that is trying to be realized.

FIG. 6C is a graph showing the transmission characteristics realized by an exemplary embodiment of the present invention.

BEST MODE OF IMPLEMENTING THE INVENTION

Explanation will now be given of details of an exemplary embodiment of the present invention with reference to the drawings.

Figure 7:
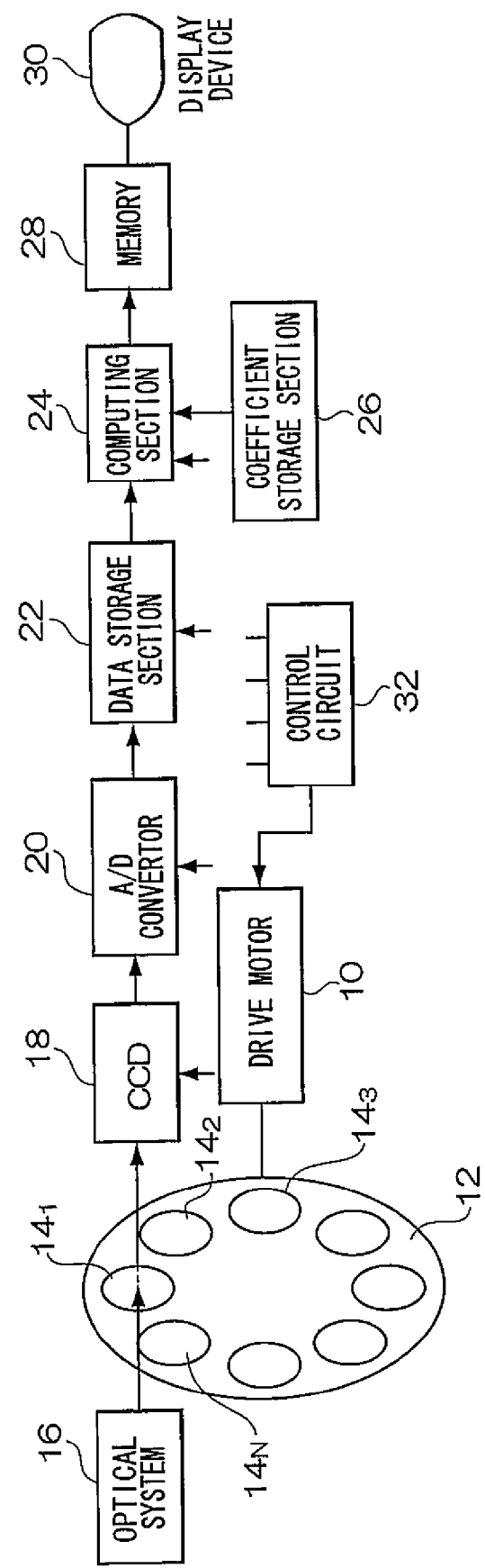
FIG. 7 is a block diagram showing the above exemplary embodiment.

As shown in FIG. 7, a multi-spectral camera of an exemplary embodiment of the present invention is equipped with plural filters $14_1$, $14_2$, . . . , $14_N$ that are provided around a circumference on a circular disk 12 that is driven by a drive motor 10. It is possible to provide, for example, 12 of these filters. Each of the filters has different spectral transmission characteristics, and an example may be given of them being configured by vacuum deposition as conductive films of different thicknesses on a substrate of glass or the like, as shown in FIG. 5.

Figure 1:
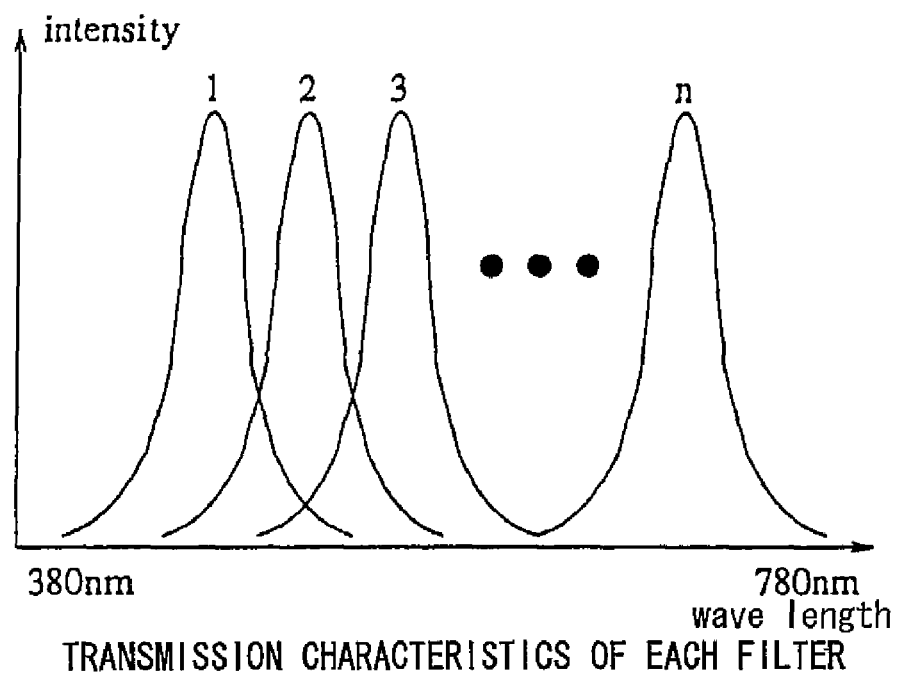
FIG. 1 is a graph showing conventional spectral transmission characteristics of each filter.
Figure 2:
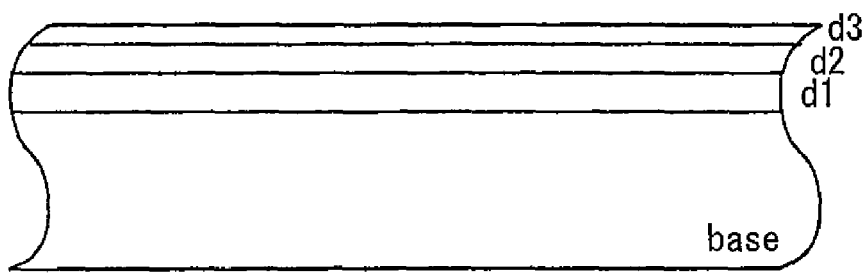
FIG. 2 is a cross-sectional diagram showing a configuration of a conventional band pass filter.
Figure 3:
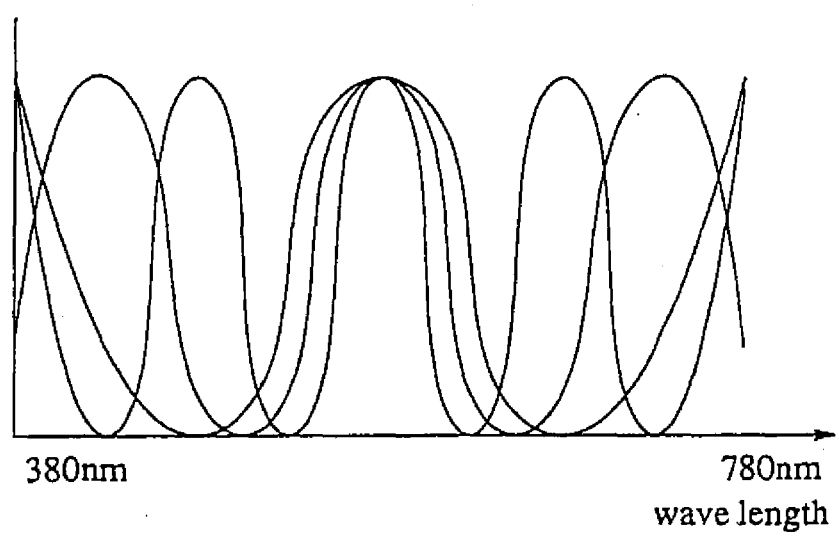
FIG. 3 is a graph showing the transmission characteristics of each layer of a conventional filter.
Figure 4:
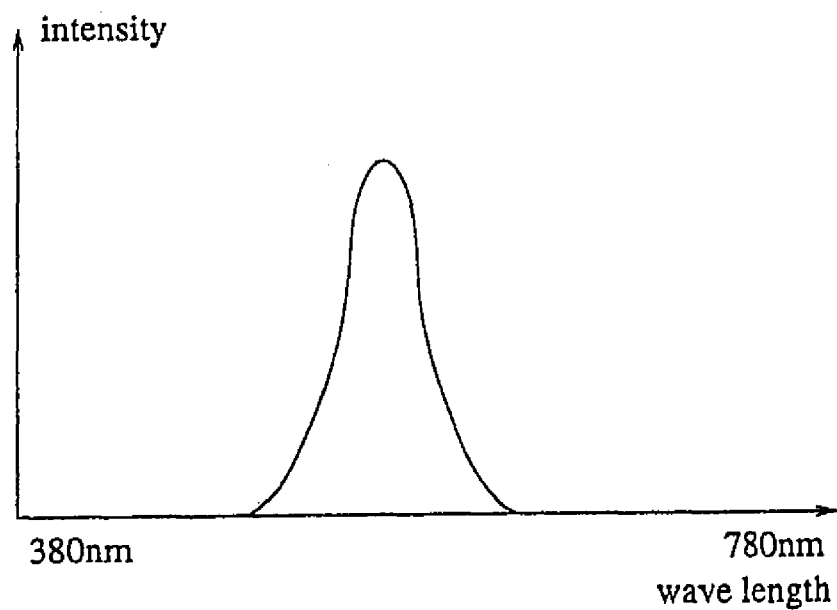
FIG. 4 is a graph showing the results of combining the transmission characteristics of each of the layers of a conventional filter.
Figure 5:
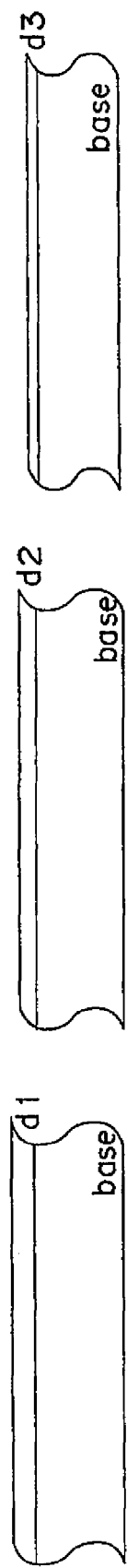
FIG. 5 is a cross-sectional diagram showing each filter of an exemplary embodiment of the present invention.

The transmission characteristics $f(\lambda)$ of filters configured like those shown in FIG. 5 are as shown in the following equation, wherein $n_1$ is the refractive index of air, $n_2$ is the refractive index of the vacuum deposited film $n_3$ is the refractive index of the substrate, and d is the thickness of the vacuum deposited film.

[Equation 1]

$$f(\lambda) = \frac{|t_1 t'_3|^2}{1 + R_1 R_3 - 2\sqrt{R_1 R_3} \cos(2kn_2 d)}$$

wherein:

$$R_1 = \left(\frac{n_2 - n_1}{n_2 + n_1}\right)^2,$$

$$R_3 = \left(\frac{n_3 - n_2}{n_3 + n_2}\right)^2,$$

$$t_1 = \frac{2n_1}{n_2 + n_1},$$

$$t'_3 = \frac{2n_2}{n_3 + n_2},$$

$$k = \frac{2\pi}{\lambda}$$

With the refractive index $n_1$ of air as 1, respective refractive indices of the vacuum deposited film and the substrate are set so that $n_2$=3.5, and $n_3$=1.5. If there are 12 filters 14 used and each of the thicknesses of the filters $d_i$ ($_i$=1, . . . , 12) are set as shown in Table 1, then the characteristics of each of the filters are as shown in FIG. 6A.

As may be seen from the spectral transmission characteristics, the filters transmit light across most regions of the spectrum, and so the problem of darkness with band pass filters of narrow band width may be solved, and the object to be photographed may be photographed in a short period of time.

Disposed on the photographic object side is an optical system 16 that is formed by photographic lens(es) such as a zoom lens or the like, with the circular disk 12 therebetween, such that the optical axis extends through the center of the filter. Also, located at the image forming position of the optical system 16, at the light transmission side of the filters with the circular disk 12 sandwiched therebetween, there is disposed a light receiving section of an image capture element 18, configured with a CDD of multiple photoelectric conversion elements that are two dimensionally arrayed. A CMOS may be used for the image capture element 18.

An analog/digital converter (A/D convertor) 20, for converting an analog signal into a digital signal, is connected to the image capture element 18, and there is a data storage section 22, for temporarily storing image data from each of the filters that has been photographed by the image capture element 18, connected to the A/D convertor 20.

Connected to the data storage section 22 there is a computing section 24 that is connected to a storage section 26. Recorded in the storage section 26 are coefficient combinations for each of the target bands, made up from plural coefficients explained below. The computing section 24 is connected via a memory 28 to a display device 30 configured from an LCD or the like.

Furthermore, in the multispectral camera a control circuit 32 is provided, configured with a microcomputer and controlling the drive motor 10, and the control circuit 32 is connected to the drive motor 10, the image capture element 18, the A/D convertor 20, the data storage section 22, the computing section 24, the memory 28 and the display device 30, respectively.

Next, explanation will be given of the groups of coefficients stored in the coefficient storage section 26. If the spectral transmission characteristics of the respective optical filters $14_1$, $14_2$, . . . , $14_N$ are designated by $f_i(\lambda)$ (i=1, 2, 3, . . . , N), the spectral distributions of the incident light $s(\lambda)$, then the data corresponding to the received light amount that is output from each of the image capture devices when light has been transmitted through each of the optical filters and received at the CCD, that is to say the pixel values $I_i$ of the image, are represented by the following formula. Here, the pixel values are presumed to be proportional to the strength of the incident light. Generally, the charge quantity of the cells of a CCD satisfy this presumption.

[Equation 2]

$$I_i = \int f_i(\lambda) s(\lambda) d\lambda \qquad (1)$$

The values of I, obtained by the linear combination of these pixel values with the coefficients $a_i$, may be expressed in the following manner.

TABLE 1

| Filter No. | 1 | 2 | 3 | 4 | 5 | 6 | 7 | 8 | 9 | 10 | 11 | 12 |
|---|---|---|---|---|---|---|---|---|---|---|---|---|
| Filter Thickness $d_i$ (nm) | 56.6 | 61.4 | 66.1 | 70.9 | 75.7 | 80.4 | 85.2 | 90.0 | 94.7 | 99.5 | 104.2 | 109.0 |

[Equations 3]

$$I = \sum_{i=1}^{N} a_i I_i \quad (2)$$

$$= \sum_{i=1}^{N} a_i \int f_i(\lambda)s(\lambda)d\lambda \quad (3)$$

$$= \int \left(\sum_{i=1}^{N} a_i f_i(\lambda)\right) s(\lambda)d\lambda \quad (4)$$

Therefore, I is a value that is equivalent to the pixel value of an image photographed using a filter with the spectral transmission characteristics g'(λ) shown below.

[Equation 4]

$$g'(\lambda) = \sum_{i=1}^{N} a_i f_i(\lambda) \quad (5)$$

If, when the base of the functional space of each of the filter transmission characteristics $f_i(\lambda)$ is considered, then if the target spectral transmission characteristics g(λ) exist in extended vector space, then the target spectral transmission characteristics may be computed as g'(λ) in the above formula (5). However, generally the target spectral transmission characteristics g(λ) does not exist in extended vector space, and so the most appropriate value for the coefficient $a_i$ is determined using the method of least squares. Explanation will be given below of how the method of least squares is used for determining the coefficient $a_i$. The most appropriate coefficient $a_i$ is determined by deriving $a_i$ which gives the minimum value of integral D, below, of the squares of the errors.

[Equation 5]

$$D = \int \left(g(\lambda) - \sum_{i=1}^{N} a_i f_i(\lambda)\right)^2 d\lambda \quad (6)$$

If the above formula 6 is differentiated with respect to $a_k$ then the following equations are obtained.

[Equation 6]

$$\frac{dD}{da_k} = \int \frac{d}{da_k}\left(g(\lambda) - \sum_{i=1}^{N} a_i f_i(\lambda)\right)^2 d\lambda \quad (7)$$

$$= 2\int -f_k(\lambda)\left(g(\lambda) + \sum_{i=1}^{N} a_i f_i(\lambda)\right)d\lambda \quad (8)$$

$$= 2\int \left(-f_k(\lambda)g(\lambda) + \sum_{i=1}^{N} a_i f_k(\lambda) f_i(\lambda)\right) \quad (9)$$

$$= -2(f_k, g) + 2\sum_{i=1}^{N} a_i(f_k, f_i) \quad (10)$$

In formula (10) ($f_k$, g) indicates the inner product of the function $f_k$ and the function g. If each differential of $a_k$ is set to 0, then if they are collected together and expressed as a matrix then the following formula may be obtained.

[Equation 7]

$$\begin{pmatrix} F_{11} & F_{21} & \cdots & F_{1N} \\ F_{21} & F_{22} & \cdots & F_{2N} \\ \vdots & \vdots & \ddots & \vdots \\ F_{N1} & F_{N2} & \cdots & F_{NN} \end{pmatrix} \begin{pmatrix} a_1 \\ a_2 \\ \vdots \\ a_N \end{pmatrix} = \begin{pmatrix} G_1 \\ G_2 \\ \vdots \\ G_N \end{pmatrix} \quad (11)$$

Wherein, $F_{ij}$, $G_i$ (i=1, 2, 3, ... N, j=1, 2, 3, ... N) are as set out below.

[Equations 8]

$$F_{ij}=F_{ji}=(f_i,f_j)=\int f_i(\lambda)f_j(\lambda)d\lambda \quad (12)$$

$$G_i=(f_i,g)=\int f_i(\lambda)g(\lambda)d\lambda \quad (13)$$

In order to solve formula (11) for the coefficient $a_i$ the values of the inner products of each of the spectral characteristics are necessary. In actual computation by a computer the spectral transmission characteristics shown by the following formula (14) and formula (15) are computed by discretization and summation. If the discretization interval is Δλ then the coefficient $a_i$ of formula (11) may be computed by the following formula. Herein, $\lambda_o$ is the wavelength of the reference from which the summation computation is started.

[Equation 9]

$$F_{ij} = \sum_D f_i(\lambda_0 + n\Delta\lambda) f_i(\lambda_0 + n\Delta\lambda) \quad (14)$$

$$G_1 = \sum_n f_1(\lambda_0 + n\Delta\lambda) g(\lambda_0 + n\Delta\lambda) \quad (15)$$

In the coefficient storage section 26 of the exemplary embodiment of the present invention, the coefficients $a_i$ that have been computed according to the above, that is to say groups of N individual coefficients, are stored in advance corresponding to the respective objective band, as shown below.

Band 1: $a_1, a_2, a_3, \ldots a_N$

Band 2: $a_1, a_2, a_3, \ldots a_N$

Band 3: $a_1, a_2, a_3, \ldots a_N$

...

Band N: $a_1, a_2, a_3, \ldots a_N$      Equation 10

If 12 of the filters 14 are used having the characteristics $f_i(\lambda)$ shown in FIG. 6A for the realization of 12 individual bands having the spectral characteristics $g_i$ (i=1, ..., 12) shown in FIG. 6B, then the values of the respective coefficients $a_i$ are as shown in Table 2, and the actual realized transmission characteristics are as per FIG. 6C.

TABLE 2

| Band No. | $a_1$ | $a_2$ | $a_3$ | $a_4$ | $a_5$ | $a_6$ | $a_7$ | $a_8$ | $a_9$ | $a_{10}$ | $a_{11}$ | $a_{12}$ |
|---|---|---|---|---|---|---|---|---|---|---|---|---|
| 1 | 1.75 | 2.97 | −4.65 | 2.16 | −2.80 | 5.05 | −8.46 | 11.91 | −13.87 | 11.65 | −5.99 | 1.04 |
| 2 | −1.33 | 2.28 | 4.68 | −6.36 | 1.43 | 1.12 | −2.66 | 4.12 | −5.14 | 4.30 | −2.03 | 0.15 |
| 3 | 0.66 | −3.49 | 3.55 | 6.94 | −10.77 | 5.90 | −4.20 | 4.97 | −5.54 | 4.34 | −1.98 | 0.16 |
| 4 | 0.47 | −0.22 | −3.55 | 2.92 | 10.79 | −15.10 | 6.27 | −0.01 | −2.11 | 2.01 | −0.08 | −0.06 |
| 5 | 0.77 | −1.21 | 1.75 | −5.69 | 1.88 | 18.92 | −27.32 | 17.21 | −8.74 | 4.67 | −1.88 | 0.14 |
| 6 | 0.40 | −0.16 | −0.70 | 2.75 | −8.26 | 1.47 | 26.57 | −36.58 | 20.09 | −5.79 | 1.08 | −0.37 |
| 7 | 1.68 | −3.26 | 3.94 | −5.17 | 8.60 | −14.69 | 0.57 | 41.88 | −58.95 | 36.35 | −12.26 | 1.81 |
| 8 | −3.11 | 8.23 | −12.59 | 17.65 | −25.89 | 40.02 | −56.52 | 40.97 | 16.60 | −46.23 | 27.10 | −5.94 |
| 9 | 3.94 | −7.77 | 13.04 | −23.85 | 42.88 | −75.92 | 128.21 | −188.10 | 193.82 | −115.61 | 36.31 | −6.25 |
| 10 | 16.55 | −30.58 | 33.98 | −35.97 | 35.47 | −27.82 | 0.28 | 60.90 | −143.12 | 164.73 | −88.71 | 15.84 |
| 11 | 0.32 | 5.46 | −21.40 | 47.83 | −90.75 | 157.54 | −248.53 | 337.69 | −359.05 | 257.24 | −101.84 | 16.24 |
| 12 | −18.11 | 31.82 | −37.44 | 45.26 | −54.51 | 63.16 | −62.20 | 40.82 | 3.79 | −41.35 | 32.89 | −4.87 |

Figure 8:
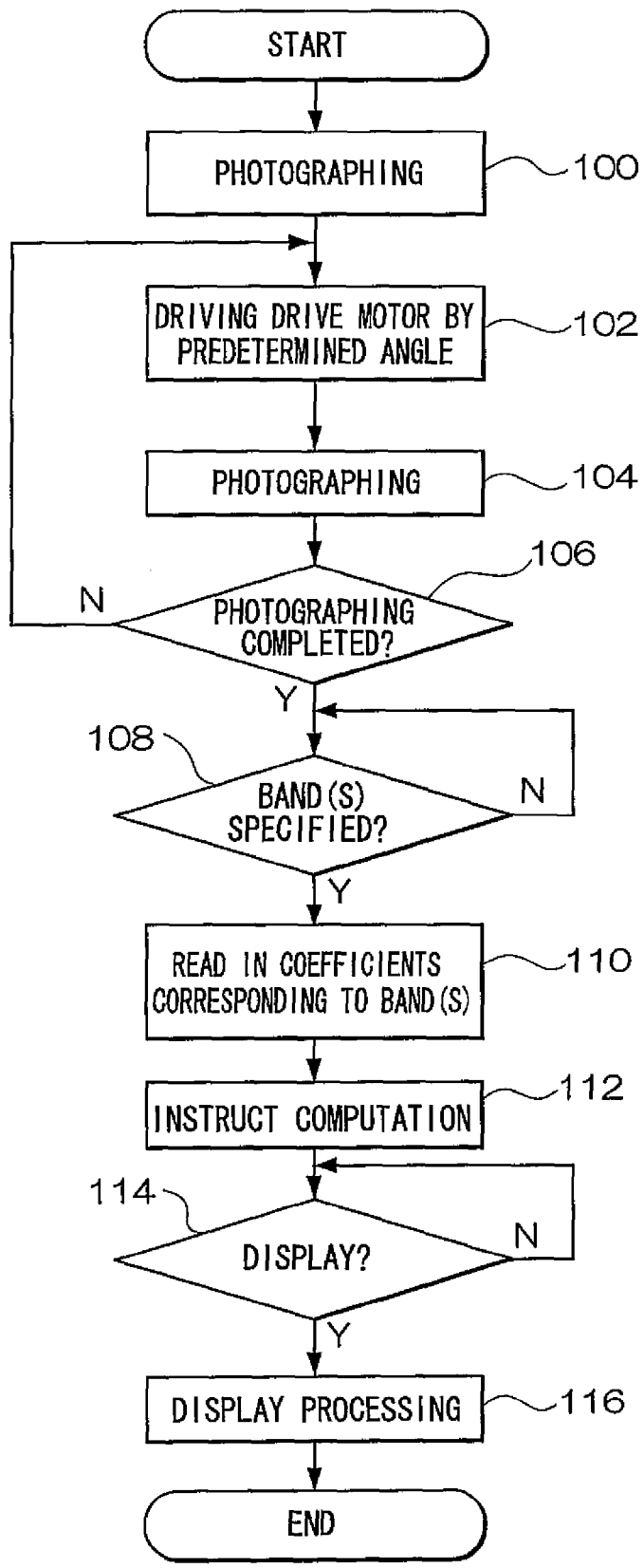
FIG. 8 is a flow chart showing a processing routine for the above exemplary embodiment.

A processing routine by the control circuit of the present exemplary embodiment will now be explained with reference to FIG. 8. When a non-illustrated main switch is on, then the multispectral camera is activated, and at step 100 the object is photographed by the image capture element 18 through the initial filter 14$_1$. The image data of plural pixel values obtained by the photographing, after being converted into a digital signal by the A/D convertor 20, are stored in the data storage section 22.

Next, at step 102, the drive motor 10 is rotated a predetermined angle placing the filter 14$_2$ in the optical axis, and the object is photographed by the image capture element 18 through the filter 14$_2$ in the same manner as above. In step 104, it is determined whether or not photographing has been carried out with all of the filters 14$_1$ to 14$_N$, and if photographing with all of the filters is not yet completed then the process returns to step 102 and, by the drive motor 10 rotating by the predetermined angle, the next filter is placed in the optical axis and photographing continues.

Respective image data that has been photographed in the above manner is converted into digital data by the A/D convertor 20, and stored as image data for each filter in the data storage section 22.

In the next step 108 it is determined whether or not the band has been specified by a user using a non-illustrated operation section, and if it is determined that the band has been specified, then in step 110 the N individual coefficients a$_i$ that correspond to the specified band are read in from the coefficient storage section 26, and in step 112 the coefficients a$_i$ that have been read in are input into the computing section 24 and instruction to carry out computation is given.

In the computing section 24 by multiplying the image data for each of the filters that is stored in the data storage section together with the read in coefficients a$_i$ in accordance with the formula (2), the image data corresponding to the specified band(s) is generated and stored in the memory 28.

The manner in which the band(s) is/are specified may be any of a number of ways, and all of the bands may be specified, or only the bands that are desired to be measured may be specified. Also, specification may be carried out prior to photographing.

In the next step 114 it is determined whether or not instruction has been carried out, from a user by operation of the operation section, to display the image, and if the display of the image has been instructed then the image data corresponding to the specified band(s) is used and the image is displayed.

Here, described above is an example of filters configured with single layers by vacuum deposition, however filters configured from plural films by vacuum deposition may be used, but in order to have good yield it is preferable that the number of layers of film is the smallest possible.

However, if the yield during filter manufacturing is not so important, but it is desired to have the best possible S/N ratio for the image data obtained for each of the bands, then the filter transmission characteristics may be set so as to correspond with each of the rows of the Hadamard S Matrix. Details regarding the Hadamard S Matrix are contained in Hadamard Transform Optics, by M. Harwit and N. J. A. Sloane Academic Press, (1979 Edition), but an example is shown here of a dividing the spectral region to be measured into 7 bands. A 7×7 sized S matrix is provided below.

[Equation 11]

$$S = \begin{pmatrix} 1 & 1 & 1 & 0 & 1 & 0 & 0 \\ 1 & 1 & 0 & 1 & 0 & 0 & 1 \\ 1 & 0 & 1 & 0 & 0 & 1 & 1 \\ 0 & 1 & 0 & 0 & 1 & 1 & 1 \\ 1 & 0 & 0 & 1 & 1 & 1 & 0 \\ 0 & 0 & 1 & 1 & 1 & 0 & 1 \\ 0 & 1 & 1 & 1 & 0 & 1 & 0 \end{pmatrix}$$

In this matrix, corresponding to each of the bands, the rows correspond to the transmission characteristics of each of the filters. The filter characteristics are set such that for the portions where the term is equal to 1, the band light is allowed to be transmitted, and for the portions where the term is 0 blocked. For example, the first row is (1, 1, 1, 0, 1, 0, 0) and the first filter characteristics are such that bands 1, 2, 3 and 5 are transmitted, and bands 4, 6, and 7 are blocked. The characteristics of the second filter are such that, by the second row of the S matrix (1, 1, 0, 1, 0, 0, 1), the bands 1, 2, 4, and 7 are transmitted and the bands 2, 4, and 5 are blocked. The transmission characteristics up to the seventh filter are set in a similar manner. If the characteristics of the filters are set in this manner, then when the images of each of the bands are computed the coefficients a$_i$ of the formula (2) correspond to each of the rows in the inverse matrix of matrix S. In the case of the above S matrix the coefficients are shown in Table 3.

TABLE 3

| Band No. | $a_1$ | $a_2$ | $a_3$ | $a_4$ | $a_5$ | $a_6$ | $a_7$ |
|---|---|---|---|---|---|---|---|
| 1 | 0.25 | 0.25 | 0.25 | −0.25 | 0.25 | −0.25 | −0.25 |
| 2 | 0.25 | 0.25 | −0.25 | 0.25 | −0.25 | −0.25 | 0.25 |
| 3 | 0.25 | −0.25 | 0.25 | −0.25 | −0.25 | 0.25 | 0.25 |
| 4 | −0.25 | 0.25 | −0.25 | −0.25 | 0.25 | 0.25 | 0.25 |

TABLE 3-continued

| Band No. | $a_1$ | $a_2$ | $a_3$ | $a_4$ | $a_5$ | $a_6$ | $a_7$ |
|---|---|---|---|---|---|---|---|
| 5 | 0.25 | −0.25 | −0.25 | 0.25 | 0.25 | 0.25 | −0.25 |
| 6 | −0.25 | −0.25 | 0.25 | 0.25 | 0.25 | −0.25 | 0.25 |
| 7 | −0.25 | 0.25 | 0.25 | 0.25 | −0.25 | 0.25 | −0.25 |

INDUSTRIAL APPLICABILITY

Since filters are used that have a single, or a few, layers of optical films that have been vacuum deposited, the yield during filter production may be improved, and furthermore, since the transmitted light amount of each of the filters is large, a photographing device may be provided that may photograph bright images.

EXPLANATION OF THE REFERENCE NUMERALS

10 DRIVE MOTOR
18 CCD
24 COMPUTING SECTION

The invention claimed is:

1. A photographing device comprising:
more than four filters, wherein each filter has a spectral transmission characteristic that simultaneously transmits light across more than one region of a spectrum;
a photographing means that is provided with a plurality of photoelectric converting elements and that receives light from a photographic object through the respective filters with the photoelectric converting elements and that outputs image data according to the amount of the light received;
a storage means that stores, for each band of a plurality of bands, plural coefficients for converting the filter spectral transmission characteristics into spectral transmission characteristics of the target band(s), wherein the band width of the spectral transmission characteristic of the target band(s) has a narrower band width than the spectral transmission characteristic of the filters; and
a converting means for, using the image data output from the photographing means and using the plurality of coefficients that corresponds with at least one of the bands that have been stored in the storage means, converting the image data that has been output from the photographing means into image data that corresponds with the at least one of the bands.

2. The photographing device according to claim 1, wherein each of the more than four filters are respectively configured to comprise vacuum deposited optical films of a single layer, or plural, with different film thickness.

3. The photographing device according to claim 1 or 2, wherein the converting means uses a plurality of coefficients corresponding respectively to a plurality of bands, and converts into image data corresponding respectively to a plurality of bands.

4. The photographing device according to claim 3 further comprising a display means for displaying an image based on the image data that has been converted by the converting means.

5. The photographing device according to claim 1, further comprising an operating section for specifying a set of bands from the plurality of bands.

6. The photographing device according to claim 1, wherein the converting means performs linear addition computation.

7. The photographing device according to claim 1, wherein the converting means performs more than three product sum operations.

8. The photographing device according to claim 1, further comprising an operation section that specifies the target band(s) correspondingly to the operation of the user, and
wherein the converting means reads N individual coefficients that correspond to the specified target band(s) from the storage means, and converts the image data that has been output from the photographing means in to the image data that corresponds with the target band(s) by using the read N individual coefficients.

9. The photographing device according to claim 2, wherein the thickness of each film is selected to produce different desired spectral transmission characteristics of each filter.

10. The photographing device according to claim 2, wherein the more than four filters are selected from a group of filters consisting of a filter having a thickness of 56.6 nm, a filter having a thickness of 61.4 nm, a filter having a thickness of 66.1 nm, a filter having a thickness of 70.9 nm, a filter having a thickness of 75.7 nm, a filter having a thickness of 80.4 nm, a filter having a thickness of 85.2 nm, a filter having a thickness of 90.0 nm, a filter having a thickness of 94.7 nm, a filter having a thickness of 99.5 nm, a filter having a thickness of 104.2 nm, and a filter having a thickness of 109.0 nm.

11. A photographing device comprising:
more than four filters, wherein each filter has a spectral transmission characteristic that simultaneously transmits light across more than one region of a spectrum;
a photographing means that is provided with a plurality of photoelectric converting elements and that receives light from a photographic object through the respective filters with the photoelectric converting elements and that outputs image data according to the amount of the light received;
a storage means that stores, for each band of a plurality of bands, plural coefficients for converting the filter spectral transmission characteristics into spectral transmission characteristics of the target band(s), wherein the band width of the spectral transmission characteristic of the target band(s) has a narrower band width than the spectral transmission characteristic of the filters; and
a converting means for converting the image data that has been output from the photographing means into image data that corresponds with the at least one of the bands.

* * * * *